(12) United States Patent
Royer et al.

(10) Patent No.: US 10,108,973 B2
(45) Date of Patent: Oct. 23, 2018

(54) PROVIDING AN ENERGY TARGET FOR HIGH ENERGY USERS

(71) Applicant: Opower, Inc., Arlington, VA (US)

(72) Inventors: David Royer, San Francisco, CA (US); Suelyn Yu, San Francisco, CA (US); Kerri Morabito, Mason, OH (US)

(73) Assignee: OPOWER, INC., Arlington, VA (US)

( * ) Notice: Subject to any disclaimer, the term of this patent is extended or adjusted under 35 U.S.C. 154(b) by 771 days.

(21) Appl. No.: 14/458,159

(22) Filed: Aug. 12, 2014

(65) Prior Publication Data

US 2015/0310019 A1  Oct. 29, 2015

Related U.S. Application Data

(60) Provisional application No. 61/984,594, filed on Apr. 25, 2014.

(51) Int. Cl.
*G06F 17/30* (2006.01)
*G06Q 30/02* (2012.01)
*G06Q 50/06* (2012.01)

(52) U.S. Cl.
CPC .............. *G06Q 30/02* (2013.01); *G06Q 50/06* (2013.01)

(58) Field of Classification Search
None
See application file for complete search history.

(56) References Cited

U.S. PATENT DOCUMENTS

| | | |
|---|---|---|
| 4,334,275 A | 6/1982 | Levine |
| 4,843,575 A | 6/1989 | Crane |
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Sana A Al Hashemi

(74) *Attorney, Agent, or Firm* — Cooper Legal Group, LLC

(57) ABSTRACT

The subject technology provides for identifying a set of similar users. Energy usage data is retrieved for the set of similar users. Next, based at least on the retrieved energy usage data, a comparison of energy usage of each user in the set of similar users is performed. Based on the comparison of energy usage, at least one user is selected from the set of similar users to include in a campaign. A target for energy usage is then identified for the at least one user.

18 Claims, 8 Drawing Sheets

(56) References Cited

U.S. PATENT DOCUMENTS

| | | |
|---|---|---|
| 6,327,605 B2 | 12/2001 | Arakawa et al. |
| 6,609,048 B2 * | 8/2003 | Matsuo ................ G06Q 50/06 700/291 |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| 7,991,513 B2 | 8/2011 | Pitt |
| 8,065,098 B2 | 11/2011 | Gautam |
| 8,166,047 B1 | 4/2012 | Cohen et al. |
| 8,180,591 B2 | 5/2012 | Yuen et al. |
| 8,239,178 B2 | 8/2012 | Gray et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,478,447 B2 | 7/2013 | Fadell et al. |
| 8,489,245 B2 | 7/2013 | Carrel et al. |
| 8,583,288 B1 | 11/2013 | Rossi et al. |
| 8,630,741 B1 | 1/2014 | Matsuoka et al. |
| 8,660,813 B2 | 2/2014 | Curtis et al. |
| 8,690,751 B2 | 4/2014 | Auphan |
| 8,751,432 B2 | 6/2014 | Berg-Sonne et al. |
| 8,805,000 B2 | 8/2014 | Derby et al. |
| 9,031,703 B2 | 5/2015 | Nakamura et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0103549 A1 | 5/2006 | Hunt et al. |
| 2007/0061735 A1 | 3/2007 | Hoffberg et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0167535 A1 | 7/2008 | Stivoric et al. |
| 2008/0195561 A1 | 8/2008 | Herzig |
| 2008/0281473 A1 | 11/2008 | Pitt |
| 2008/0281763 A1 | 11/2008 | Yliniemi |
| 2008/0306985 A1 | 12/2008 | Murray et al. |
| 2009/0106202 A1 | 4/2009 | Mizrahi |
| 2009/0204267 A1 | 8/2009 | Sustaeta et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0202446 A1 * | 8/2011 | Kremen ................ G01D 4/004 705/37 |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0107850 A1 | 4/2014 | Curtis |
| 2014/0108135 A1 * | 4/2014 | Osborn ............. G06Q 30/0271 705/14.49 |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0337107 A1 | 11/2014 | Foster |
| 2015/0019342 A1 * | 1/2015 | Gupta ................ G06Q 30/0269 705/14.66 |
| 2015/0227846 A1 | 8/2015 | Mercer et al. |
| 2015/0267935 A1 | 9/2015 | Devenish et al. |
| 2015/0269664 A1 | 9/2015 | Davidson |
| 2015/0310463 A1 | 10/2015 | Turfboer et al. |
| 2015/0310465 A1 | 10/2015 | Chan et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |

(56) References Cited

FOREIGN PATENT DOCUMENTS

| JP | 2011-027305 | 2/2011 |
|---|---|---|
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May 19, 2008, 15 pages, available at http://web.archive.orgi/web/20080519220643/bie.berkeley.edu/coolcale/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.

Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Sotfware, vol. 33, Iss. 1, pp. 1-22, Jan. 2010.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f..uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.

(56) References Cited

OTHER PUBLICATIONS

Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

\* cited by examiner

FIG. 5

PROVIDING AN ENERGY TARGET FOR HIGH ENERGY USERS

CROSS-REFERENCE TO RELATED APPLICATION

This application claims the benefit of U.S. Provisional Patent Application No. 61/984,594, entitled "Motivating High-Energy Users Through Print Mail Monthly Leaderboard With Target," filed on Apr. 25, 2014, the contents of which are incorporated in this disclosure by reference in its entirety.

BACKGROUND

The present invention generally relates to encouraging energy efficiency and, in particular, to providing a user with a communication, configured to encourage energy efficiency.

Home Energy Reports (HERs) are an example of communications that provide personalized information to users about their energy use, as well as easy-to-follow tips that can lead users to use less energy and, as a result, save money on their utility bills.

SUMMARY

Some aspects of the subject technology provide a method including identifying a set of similar users, retrieving energy usage data for the set of similar users, performing, based at least on the retrieved energy usage data, a comparison of energy usage of each user in the set of similar users, selecting, based on the comparison of energy usage, at least one user from the set of similar users to include in a campaign, and selecting a target for the at least one user.

Other aspects of the subject technology further provide a system including at least one processor, a memory device including instructions that, when executed by the at least one processor, cause the at least one processor to identify a high energy user based on a comparison of energy usage of each user in a set of similar users, determine a target for the high energy user based on a rank of the high energy user among the set of similar users, and transmit to the high energy user a communication comprising the determined target.

In addition, various aspects of the subject technology provide for a non-transitory computer-readable storage medium including instructions that, when executed by a processor, cause the processor to identify a set of similar users, identify a high energy user based on a comparison of energy usage of each user in the set of similar users, select, based on the comparison of energy usage, the high energy user to include in a campaign, determine a target for the high energy user based on a rank of the high energy user among the set of similar users, and transmit to the high energy user a communication comprising the determined target.

The aspects described above are to be regarded in an illustrative rather than a restrictive sense. It will, however, be evident that various modifications and changes may be made thereunto without departing from the broader spirit and scope of the subject technology.

BRIEF DESCRIPTION OF THE DRAWINGS

FIG. 5 illustrates examples of the interval of monthly reports, according to certain aspects of the subject technology.

DETAILED DESCRIPTION

Figure 1:
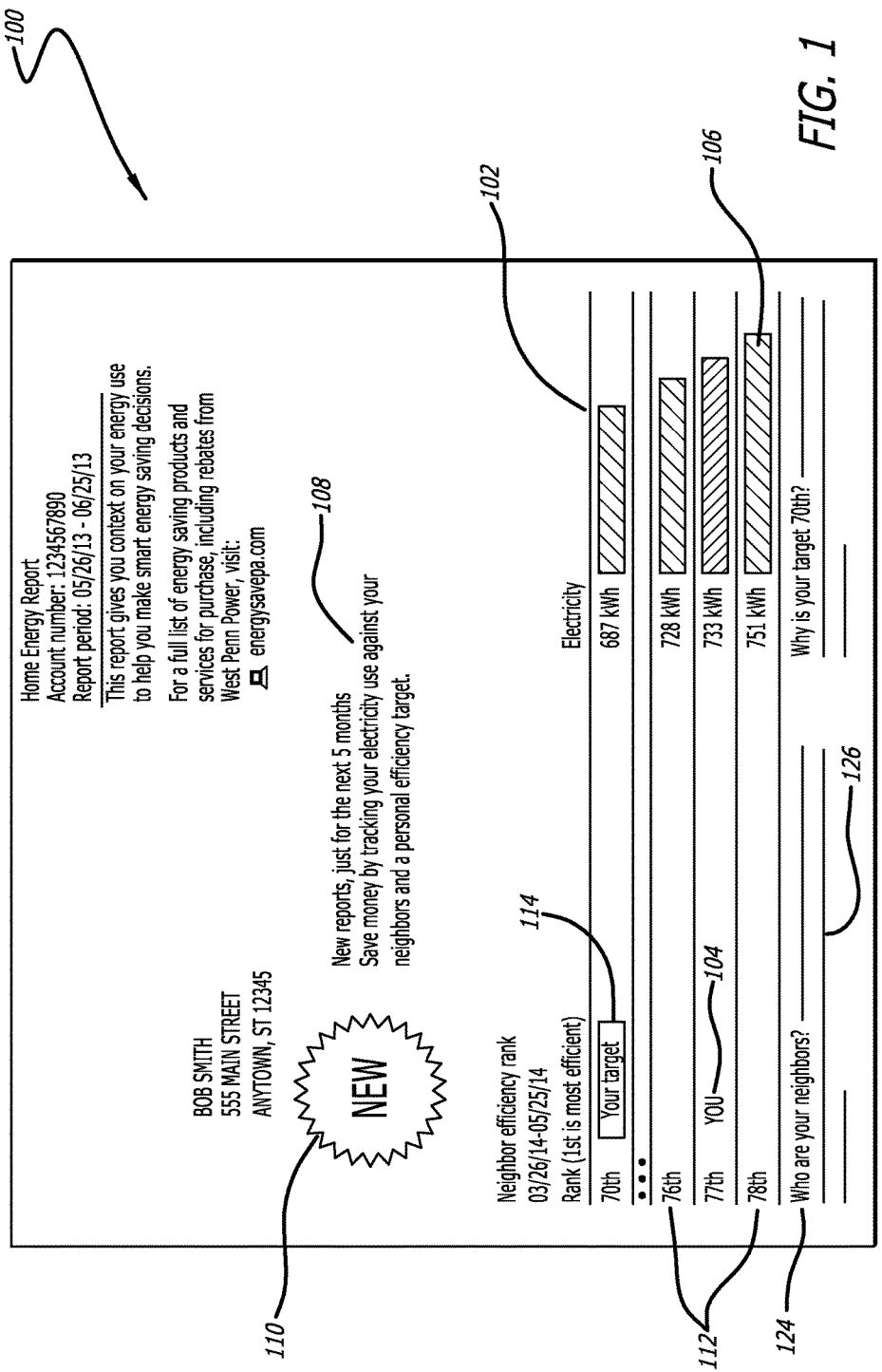
FIGS. 1-4 illustrate examples of Home Energy Reports, according to certain aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

In some cases, the HERs may include one or more normative comparisons that compare a user against themselves (e.g., their past energy usage) or their neighbors. These normative comparisons are designed to motivate users to understand the underlying causes of the differences in each comparison and subsequently reduce energy consumption.

In some instances, users with relatively high energy usage may have a worse experience with existing home energy reports ("HERs") than others. In particular, a high energy user may always see that they are using more energy than average and are underperforming or not doing well enough. Even if they are willing to improve and/or attempt to improve, they may be unable to ever see progress due to how far they are from average and due to various unchangeable factors. Over time, the user may become tired of HERs indicating that the user is making little progress and is still underperforming. As a result, the user may lose interest in improving energy efficiency and become skeptical of the normative comparisons being provided in the HERs.

Accordingly, there is a need for a system and method of motivating high energy users to improve energy efficiency. The subject technology satisfies this need and relates to a campaign configured to provide customized content for a number of high energy users. For example, a system may identify a high energy user to send customized content to, determine a target for the user, inform the user about the determined target, and provide updates to the user on progress being made to the determined target. The system may also notify the user when the user reaches the determined target.

Referring now to FIGS. 1-4, examples of home energy reports ("HERs") 100 are illustrated, according to certain aspects of the subject technology, which provide different indications and messages that are presented in a format(s) that may further motivate such high energy users to improve their home energy usage. HERs may be provided through any number of communications channels. For example, HERs may be provided to the user through print mail, email, an application communication, a cellular communication, an interactive voice response (IVR) communication, or a web page. Furthermore, HERs are provided as merely an illustrative example. Other types of communications or reports may also be sent.

Figure 2:
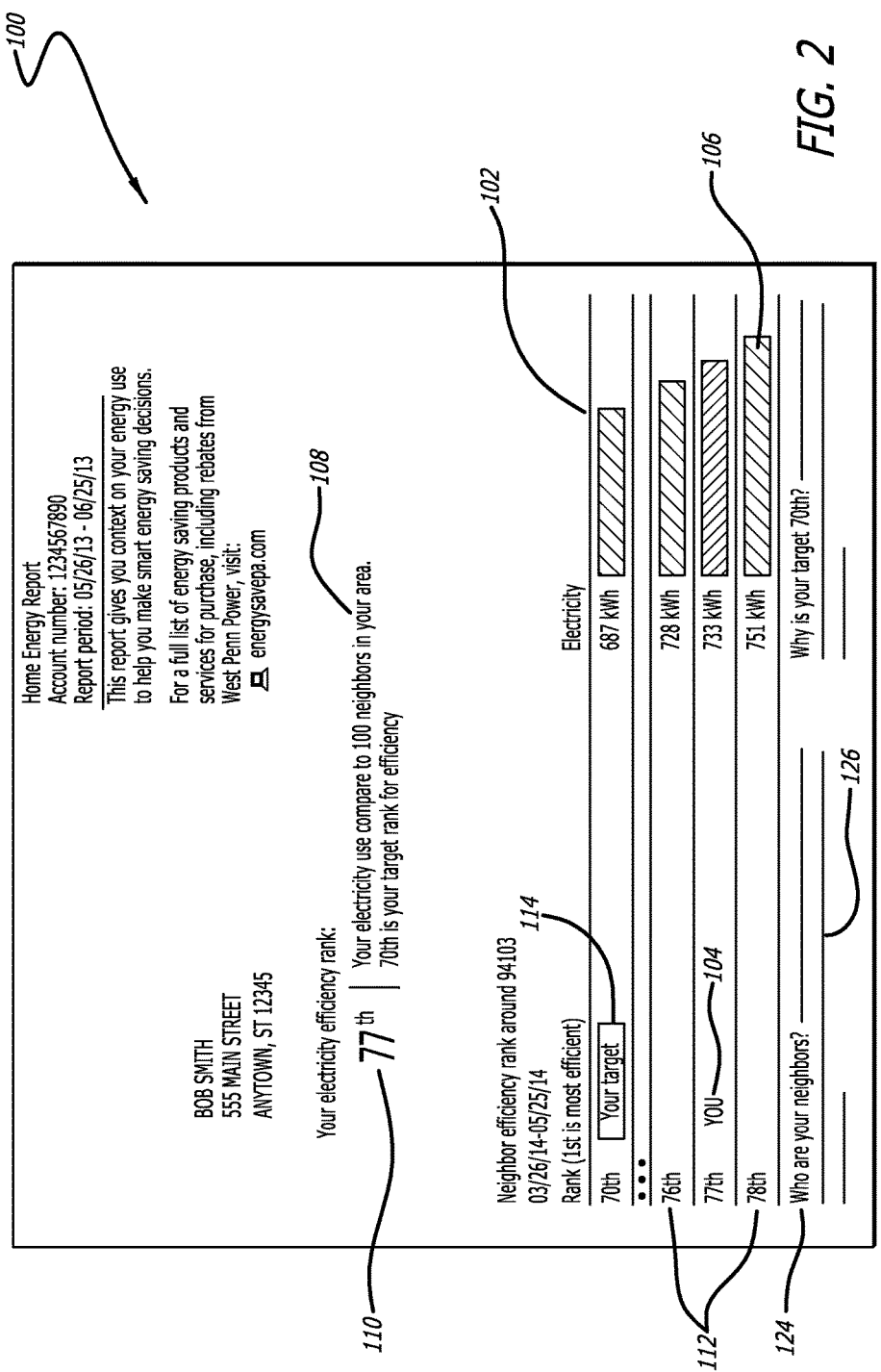
Figure 3:
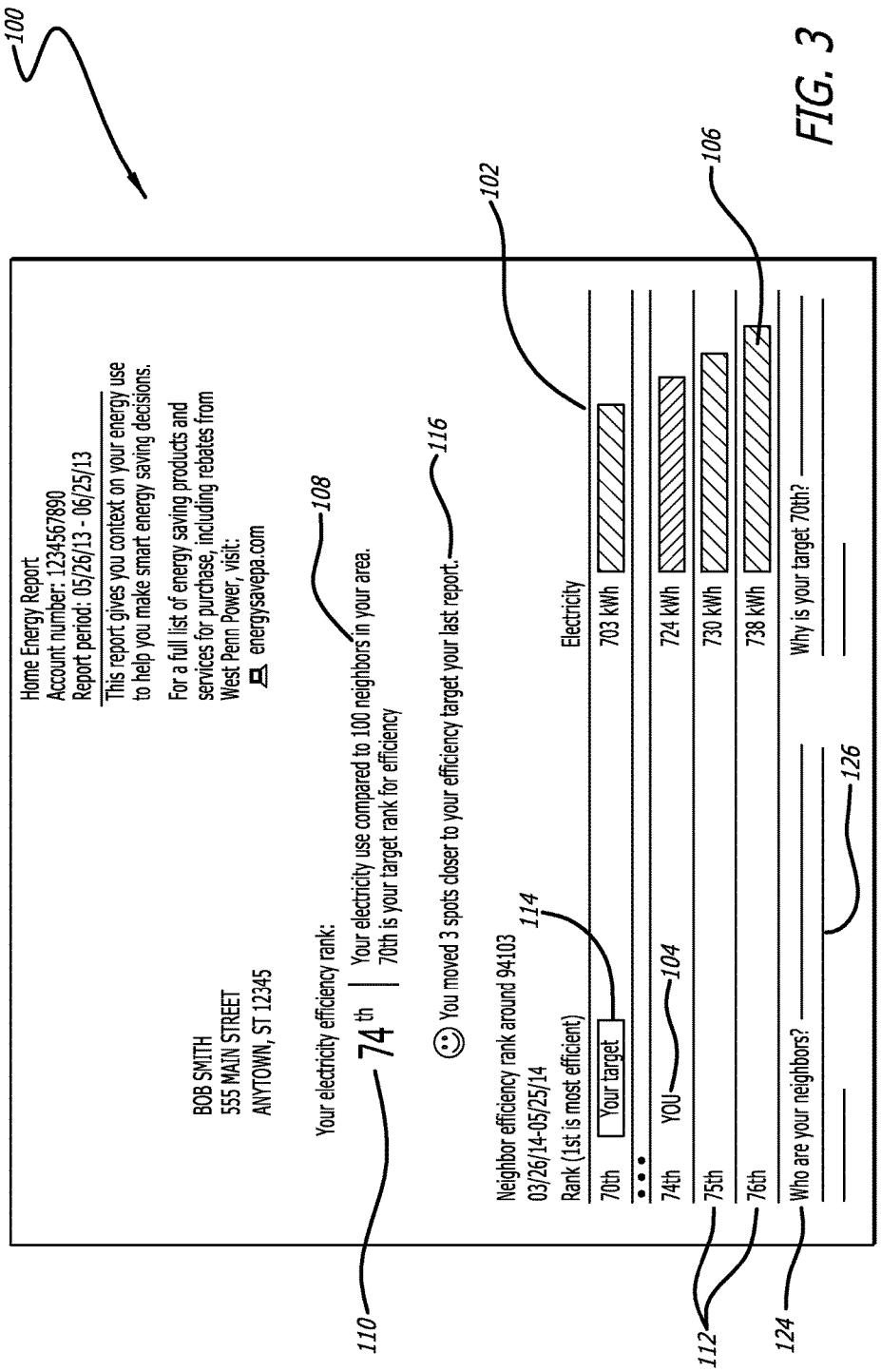

As illustrated in FIGS. 1-4, each HER 100 includes a comparison chart 102, which compares a customer 104 (e.g., a high energy user indicated as "You" in the Figures) to the customer's neighbors 112 or a set of other similar users. The results are displayed in horizontal bar graphs 106 as shown in FIGS. 1-4. A brief message 108 indicates how the customer 104 compares to their neighbors 112. An evaluation indicator 110 indicates which category and/or ranking that the customer 104 may be associated with. For example, the category can be one of several states that indicate the customer's energy usage status, including, but not limited to, "New", "Good", "Great", "More than average", etc. The evaluation indicator 110 can also indicate a ranking of the customer 104 in relation to the neighbors 112, as shown in FIGS. 2-3.

A neighbor comparison module 124 displays a dynamic neighbor description 126 that summarizes the characteristics of the neighbors that may for comparing the customer to other customers. Some characteristics may include, but is not limited to, the following:

1) The customer's actual number of neighbors (e.g., 100 in one embodiment).
2) The similarity in size of the neighbors' homes.
3) The fuel type of the neighbors.

Alternatively, in at least one embodiment, the dynamic neighbor description 126 can be a predetermined message that is more general in nature (e.g., not tailored to the specific characteristics of the customer 104).

In order for a customer 104 to receive a neighbor comparison, the customer 104 needs to have a group of neighbors 112 selected for comparison. First, a pool of eligible neighbors is selected and narrowed down to find neighbors that are similar to the customer 104. To do this, a number of passes is performed, each of which considers a subset of variable neighbor attributes. For each pass, fewer and fewer variables are considered in order to generate enough neighbors to make a valid comparison to the customer. The variables considered include, but are not limited to:

1) Geographic distance between sites.
2) Living area ("square feet" in the US or "number of bedrooms" in the UK).
3) Heat type (electric, gas or other).
4) Read cycles (corresponding to when a meter is read).
5) Dwelling type (single-family homes or multi-family homes, such as apartments and condos).

Each pass has one or more steps, and each step incrementally increases the allowable maximum distance between sites and/or the maximum difference in living area. Each step brings in more and more sites which are close enough in distance and living area, and which match other criteria, until enough neighbors are found. Typically the passes stop once 100 neighbors are found.

The frequency with which neighbor selection is run depends in part on the utility's setup. The neighbor selection process is performed once a program is set up for a utility. The process may be run later for any new customers who join the program as a result of an expansion or rolling enrollment. Also, neighbor selection process may be triggered in the event a customer changes their information (e.g., when they change their parcel data inputs).

Next, a neighbor comparison calculation compares the customer's energy use against two groups: "All Neighbors" and "Efficient Neighbors". The neighbor comparison calculation involves the following steps:

1) Identify the start and end dates of a period of comparison.
2) Identify the customer's neighbors, which is targeted at 100. If not enough qualified neighbors exist, a smaller number may be used.
3) Identify the customer's efficient neighbors, which is the 20th percentile of neighbors with the lowest use for the selected period.
4) Calculate the customer's total energy use over the time period.
5) Calculate the average energy use of all of the customer's neighbors over the time period. This results in an energy use value for the "All Neighbors" group.
6) Calculate the 20th percentile of energy use of all the customers' neighbors over the time period. This results in an energy use value for the "Efficient Neighbors" group.
7) Compare the information and generate a graph that indicates how the customer is doing.

HERs 100 as discussed previously in FIGS. 1-4 are only generated for a customer that has a minimum number of efficient neighbors, as determined by step 3 of the neighbor comparison calculation above. A customer that does not meet this requirement will not receive an HER 100.

According to some aspects, neighbors are defined by site rather than by customer. For example, if an occupant of a neighbor home relocates over the course of the program and another resident moves in, the comparison will subsequently be to the new occupant of the same home.

According to some aspects, the calculation compares customers to neighbors who are not in the program. However, it does not calculate or store neighbor comparison data for those non-program customers. It only calculates and stores neighbor comparison data for customers who are in the program and who thereby receive reports.

A customer's neighbor's previous bills may not always coincide exactly in time with the customer's previous bills. In order to arrive at the neighbor averages used to calculate the comparison, the system may align past neighbor use amounts with the customer's past use amounts. In these scenarios, the neighbor bills are pro-rated or time-shifted to align with the customer bills by determining and adjusting for the amount of overlap. The adjusted neighbor bills are then used to determine the neighbor averages.

After the neighbors (e.g. a set of similar users) are identified, the system may retrieve energy usage data for the set of similar users, compare the energy usages of each user in the set of similar users, and select a user to include in the campaign based on the comparison. For example, the system may select high energy users that use more energy than 75% of similar users to receive campaign communications. In other embodiments, other factors may also be considered when including users in the campaign.

After users for the campaign are selected, the system may identify a target 114 for each user. The target 114 may be selected so that it is reachable by the high energy user 104 and/or so the user 104 can make progress towards the target 114.

Figure 6:
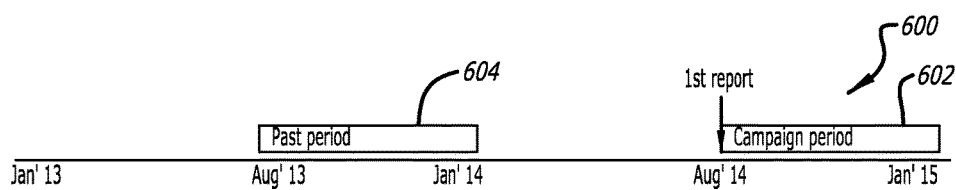
FIG. 6 illustrates an example illustrating a timeline indicating a month for a first report for a campaign period and a month indicating a past period, according to certain aspects of the subject technology.

FIG. 6 shows a sample timeline 600 illustrating the past period 604 and campaign period 602, according to certain aspects of the subject technology. In one implementation, the target 114 may be based on the user's usage data or rank among similar users for a past period 604 before the campaign period 602 (e.g., the average energy usage for the past year or 6 months, the energy usage for the previous month, etc.). For example, the target 114 could be a number of positions (e.g., 5 or 10 positions) better than the user's rank in the previous month. The target may also be based on the user's average ranking (e.g., the target rank may be a bit better than the user's average rank during the past 3 months).

The advantage of following the timeline of FIG. 6 is that extreme months are removed when users might have been on vacation by taking out the minimum, preventing customers from hitting the target in the first report period. It also gives users a round number as a target, which is likely more motivating for users, and there is some evidence that people strive to reach round-number goals.

Additionally there is also evidence that consumers interpret ranked lists in round number categories ending in zero or 5 (10, 15, 20, etc.) more favorably evaluate improvements in rank that cross one of those thresholds. Moving from 11 to 10 is more meaningful that moving from 10 to 9.

Alternatively, by reference to FIGS. 1-4, the target 114 may be based on the user's best ranking among similar users for the past period 604 in FIG. 6. For example, if the user's best rank in the past 10 months was 89 out of 100, the target 114 may be set at 89, or a number of spots better than 89. The target 114 may also be based on the user's best monthly rank during a similar period (e.g., a season) on a previous year. In some variations, the top month of a number of the top months for the user may be eliminated from consideration as a way to reduce months that might be outliers (e.g., the user may have been out of town). The target 114 may also be rounded up or down to a round number (e.g., a rank ending in 0 or 5) as some studies have shown that people are more motivated to reach round-number goals. In some implementations, the system may optionally allow a user 104 to set their own target. The user's ranking among the neighbors can used to determine what number is displayed in the evaluation indicator 110.

Figure 5:
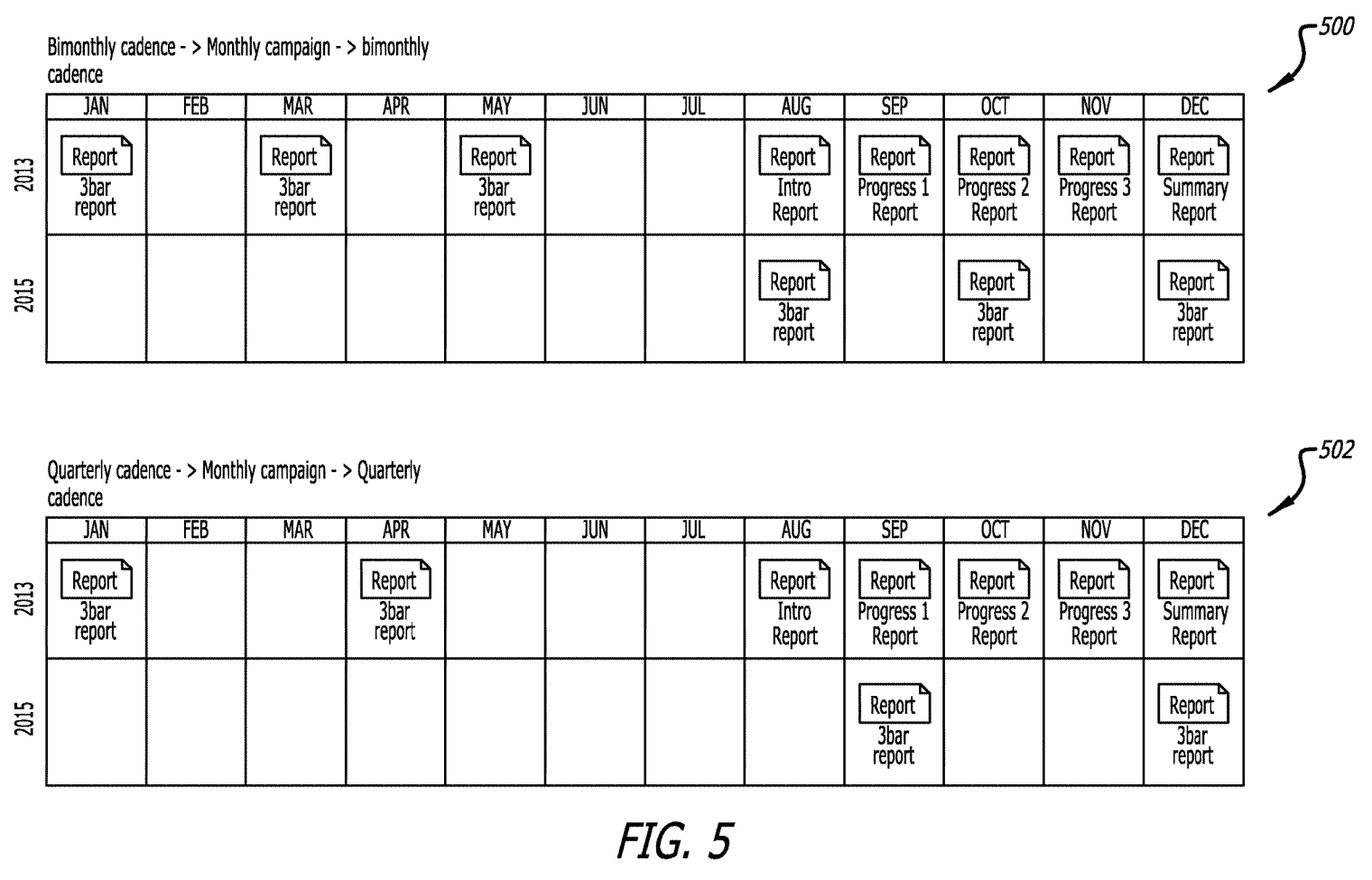

The system may monitor usage data for the user and any similar users and monitor progress made. For example, as shown in FIGS. 1-4, the system retrieves usage data for the user and the similar users, compare their usage levels, and rank the user among the rest of the similar users. The user's rank may be compared to the user's rank in previous periods and used to provide updates to the user on any progress being made toward the determined target. As shown in FIG. 5, the HERs 100 may be provided to the user on a set schedule or interval, either bimonthly 500, or quarterly 502. Furthermore, the HERs may be provided to the user as a part of the user's utility bill or as part of some other communication.

Figure 4:
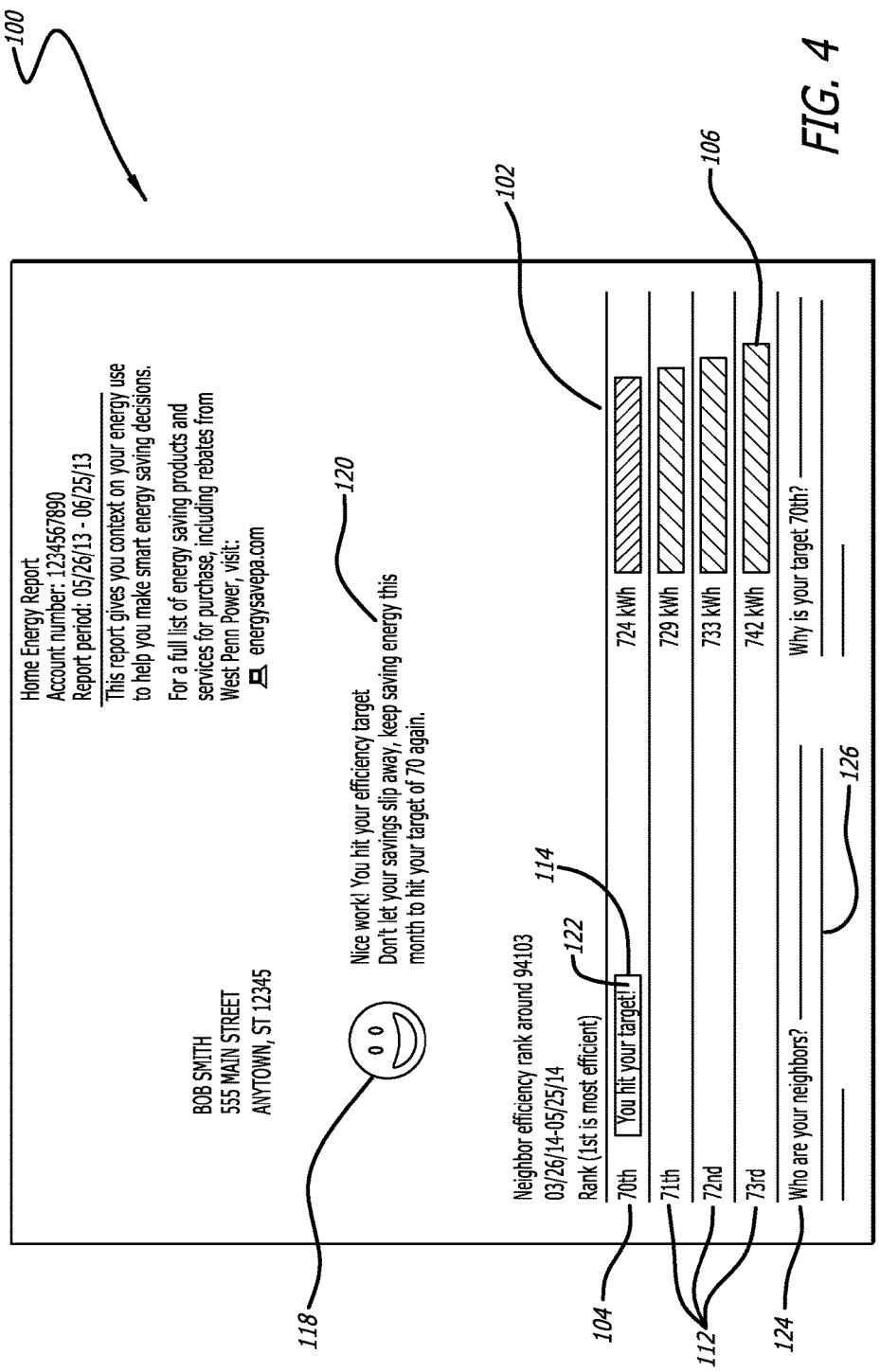

Each HER 100 (e.g. progress report) may include different messages to the user 104 that encourage the user to reach the determined target or celebrate that the user has reached the target. For example, as shown in FIG. 4, if the user 104 has hit or beat the determined target 114, a congratulatory message 120 in the progress report 100 may indicate that the user has hit or beat the target 114. Additionally, the target 114 is also has an indicator 122 to show that that user 104 has hit or beat the target 114. A congratulatory indicator 118 is also included as shown in FIG. 4. The progress report 100 may also present the user 104 with the option of setting further targets and/or a reward (e.g., a coupon, badge, or congratulatory item) for hitting the target 114. Alternatively, the system may also track how many times the user 104 has hit the determined target 114 and provide positive messages indicating that number.

If the user 104 has not hit the target 114, the system may determine whether the user 104 has moved toward the target 114. As shown in FIG. 3, the progress report 100 may include an improvement message 116 (e.g., "☺ You moved 3 spots closer to your target since your last report."). If the user 104 is within a predetermined number of spots from the target, the progress report may include an almost there message (e.g., "☺ Almost there! You are just 3 spots away from your target."). If the user 104 has moved further from the target 114, not made any progress, or in other cases, the progress report 100 may include a message indicating the number of spots the user is away from the target 114. In at least one embodiment, the user 104 may also receive a message celebrating the user's progress in saving energy and money even if the user 104 has not improved in ranking.

Additional messages included in the progress report 100 may include messages indicating that the user 104 has stayed at or above the target 114 and/or badges (e.g., stars or other icons) for each period that the user 104 has stayed at or above the target 114. The messages may also indicate the best ranking the user 104 has achieved (e.g., "Your best month was January—73rd neighbor rank."), that the user 104 has beat the average similar user, or average efficient user, and/or an amount of money saved based on the user's reduction in energy usage.

Although the campaign discussed above is targeted to high energy users, in other embodiments, different campaigns may be target other segments of utility customers. Furthermore, the campaign need not focus solely on energy usage. Usages of other types of resources (e.g., water, gas, trash, etc.) may also be targeted by the campaign.

According to some aspects, the system may prevent the users 104 from setting their own target 114. This is because not as many users 104 would participate if they had the option of choosing their own target 114. Having the target 114 picked for a user 104 offers greater motivation to meet the target 114, so long as the target 114 is reasonable.

In at least one embodiment, the target 114 is determined according to the following steps:

1) Take the ranks from the same period in the prior year, minus the month thirteen months ago. For example, for the period from August '14 to January '15, the ranks from September '13 to January '14 are used, to create the set: {80, 74, 78, 50, 81}.

2) Drop the lowest rank. The set becomes {80, 74, 78, 81}.

3) Take the minimum to get a first value. The set becomes {74}.

4) Subtract one from the month before the first month to get a second value. For example, if the rank for July '14 is 72, subtracting one from 72 yields 71. 71 is the second value.

5) Take the minimum of the resulting set of the first value and the second value: {74, 71}. The minimum is 71.

6) Round down to the nearest 5, unless it is divisible by 5. In other words, if the number already ends in 0 or 5, do not round. For example, 71 rounds down to 70.

From the above example process, 70 is the target rank.

The advantage of this process is that it reflects the user's seasonality of neighbor rank, while maintaining a target that is the same throughout the campaign (though users may be more likely to hit the target at certain points in the campaign). It only accounts for the user's seasonal trend if the first report's month reflects the seasonal trend of the campaign period.

Figure 7:
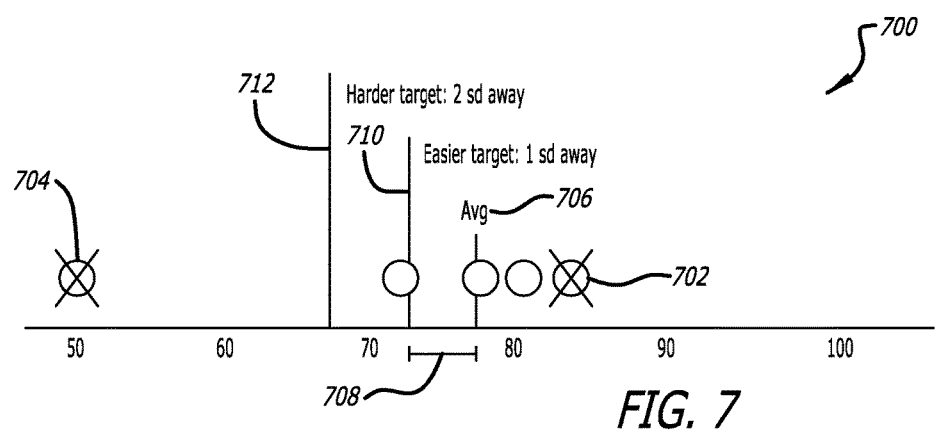
FIG. 7 illustrates an example of a technique using an average and standard deviation for determining a target, according to certain aspects of the subject technology.

FIG. 7 illustrates an example process 700 of determining a target using standard deviations. What is shown is a set of rankings taken from a past period 604. The lowest rank 702 and highest rank 704 are dropped. The average 706 is calculated from the set of remaining ranks Next, the standard deviation 708 of the set of remaining ranks is calculated. The easier target 710 is calculated by subtracting the standard deviation 708 from the average 706 and rounding down to the nearest whole number. For example, if the average is 77 and the standard deviation is 3.6, the easier target 710 is 73 (77−3.6=73.4, rounding down equals 73). The harder target 712 is calculated by subtracting twice the standard deviation 708 from the average 706 and rounding down to the nearest whole number. For example, if the average is 77 and the standard deviation is 3.6, the harder target 712 is 69 (77−2(3.6)=69.8, rounding down equals 69).

Figure 8:
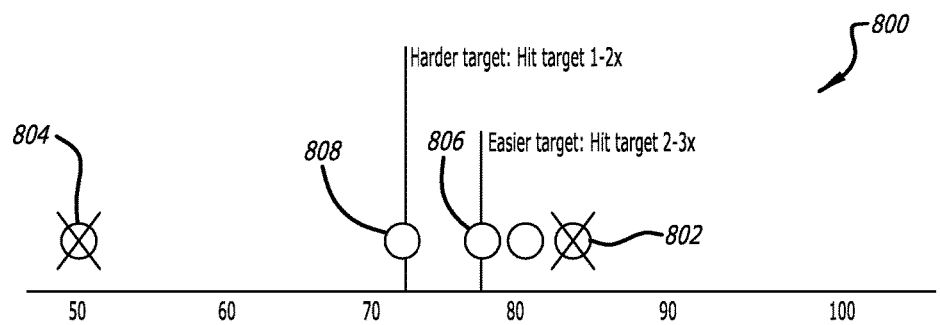
FIG. 8 illustrates an example of another technique for determining a target, according to certain aspects of the subject technology.

FIG. 8 illustrates an example process 800 of a technique using percentages for determining a target, according to certain aspects of the subject technology. What is shown is a set of rankings taken from a past period 604. The lowest rank 802 and highest rank 804 are dropped. The harder target 808 is determined based on the highest rank that is left in the set of remaining ranks. The easier target 806 is determined based on the next highest rank after the harder target 808.

Alternatively, the user's current month rank can be rounded down to the nearest 10 (or other amount). This would put the user close to their target the first month, making them more motivated to try to achieve it.

Alternatively, the user's best recent month can be rounded down by looking at the user's best rank in the past 13 months. In another version, the user's target may be the user's best rank and 10 spots lower. Alternatively, the user's best recent months can be used except for one of the best months, and dropping the resulting rank one spot lower.

In another embodiment, the target rank can be a bit lower than the user's average rank, meaning that if the user behaved as they did in the past (assuming no directional trends) they would hit the target about once every 3 months. If their current month is lower than the calculated number, then the target rank may be 1 rank lower than the current month. Alternatively, the user's best month from the same period in the previous year can be used as the target. This accounts for seasonal variations in rank.

Figure 9:
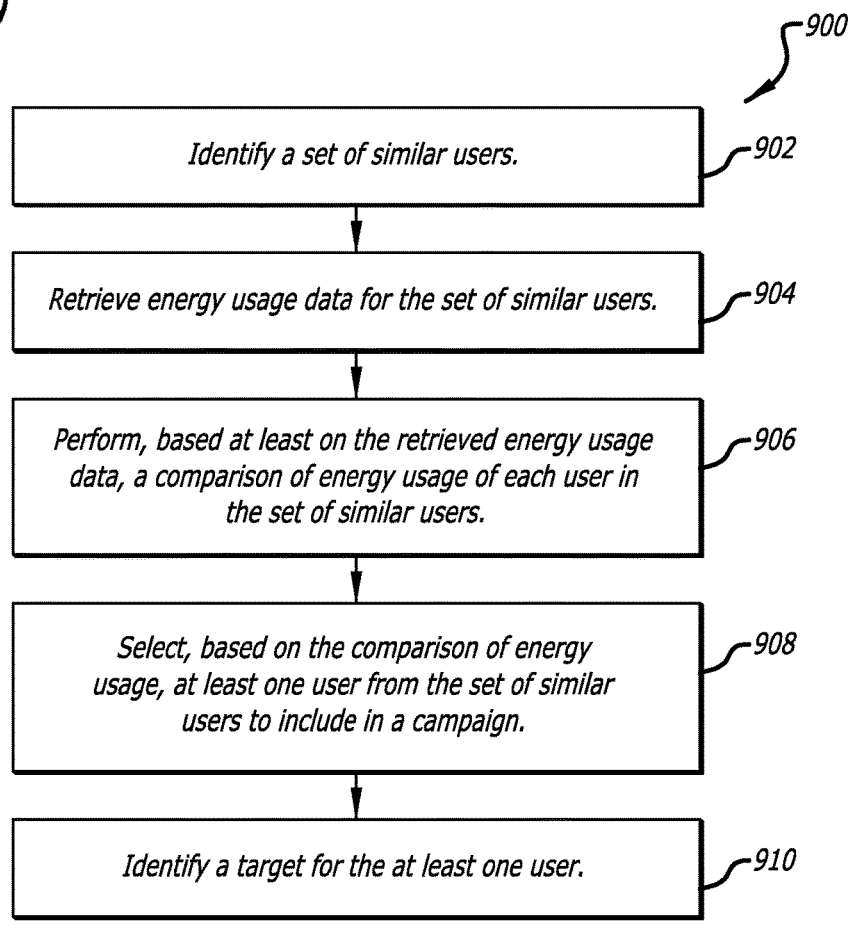
FIG. 9 conceptually illustrates an example process of determining a target, according to certain aspects of the subject technology.

FIG. 9 is a flowchart 900 that illustrates a method including the steps of: identifying a set of similar users 902, retrieving energy usage data for the set of similar users 904, performing, based at least on the retrieved energy usage data, a comparison of energy usage of each user in the set of similar users 906, selecting, based on the comparison of energy usage, at least one user from the set of similar users to include in a campaign 908, and identifying a target for the at least one user 910.

In at least one embodiment, a set of users that use more energy than a threshold percentage of the set of similar users is selected to receive a campaign communication. In an aspect, the threshold percentage is 75%. The target may be selected to be reachable by the at least one user or to have the at least one user make progress towards the target.

In at least one embodiment, the target is based on the energy usage data of the at least one user or a rank among the set of similar users for a period before the campaign begins. In an aspect, the campaign lasts for a campaign period and the energy usage data is retrieved from a previous period one year prior to the campaign period. For example, the campaign period is six months and the previous period is five months.

In at least one embodiment, the rank may be rounded down to the lowest number divisible by five. Further, in at least one embodiment, the target is based on an average ranking of the at least one user.

In at least one embodiment, the method further includes sending an outbound communication to the at least one user, the outbound communication including information regarding whether the at least one user has reached the target, such as the examples described in FIGS. 1-4.

Figure 10:
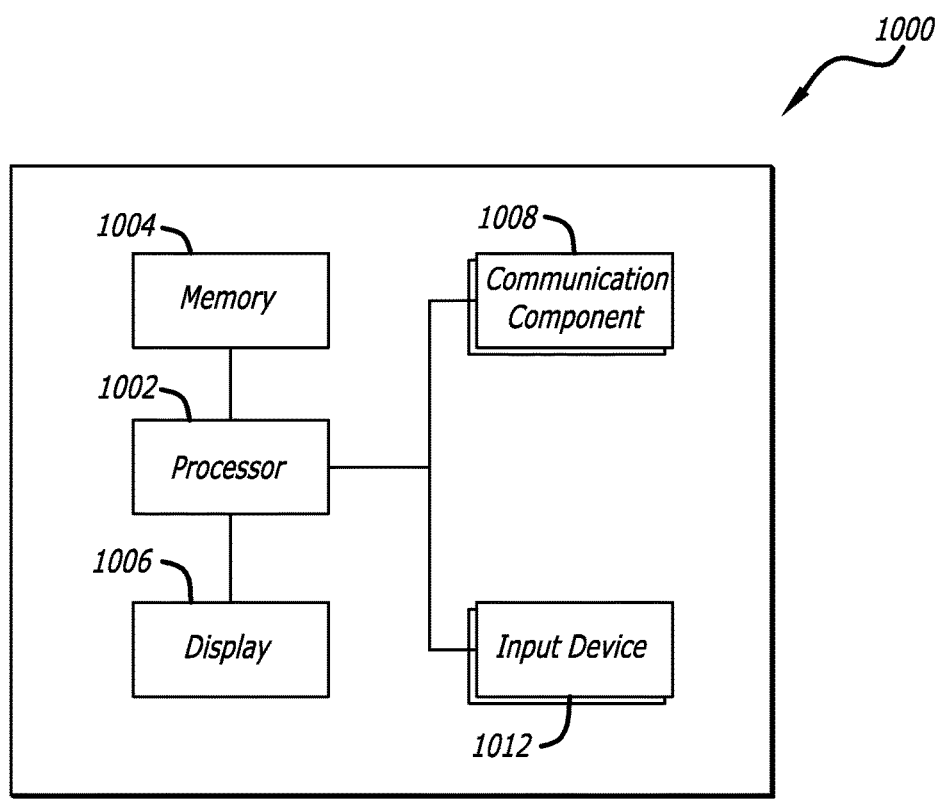
FIG. 10 illustrates a logical arrangement of a set of general components of an example computing device, according to certain aspects of the subject technology.

FIG. 10 illustrates a logical arrangement of a set of general components of an example computing device 1000 that can be implemented with the above embodiments. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one input element 1012 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1000 of FIG. 10 can include one or more communication components 1008, such as a Wi-Fi, Bluetooth, RF, wired, or wireless communication system. The device in many embodiments can communicate with a network, such as the Internet, and may be able to communicate with other such devices.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method performed by a computing device including at least one processor, the method comprising:
   identifying, by the at least one processor, a set of similar users;
   retrieving, by the at least one processor, energy usage data for the set of similar users;
   performing, by the at least one processor based at least on the retrieved energy usage data, a comparison of energy usage of each user in the set of similar users;
   generating, by the at least one processor, a ranking of the set of similar users based on the energy usage of each user in the set of similar users;
   selecting, by the at least one processor, based on the comparison of energy usage, at least one user from the set of similar users to include in a campaign communication, wherein the at least one user has a first rank in the ranking of the set of similar users;
   selecting, by the at least one processor, a target for the at least one user wherein the target is a target rank of the at least one user to improve in the ranking by reducing energy usage, wherein the target rank is determined from the first rank being rounded down to a lower number that is divisible by five; and
   generating and sending, by the at least one processor, the campaign communication to the at least one user, wherein the campaign communication comprises information regarding whether the at least one user has reached the target rank.

2. A method performed by a computing device including at least one processor, the method comprising:
   identifying, by the at least one processor, a set of similar users;
   retrieving from at least one data storage, by the at least one processor, energy usage data for the set of similar users;
   performing, by the at least one processor, based at least on the retrieved energy usage data, a comparison of energy usage of each user in the set of similar users;
   selecting, by the at least one processor based on the comparison of energy usage, at least one user from the set of similar users to include in a campaign; and
   selecting, by the at least one processor, a target for the at least one user;
   wherein the target is selected based on a measure of standard deviation of energy usage of the set of similar users and the target is rounded to a value that ends in zero or five.

3. A system comprising:
   at least one processor;
   a memory device including instructions that, when executed by the at least one processor, cause the at least one processor to:
   identify a high energy user based on a comparison of energy usage of each user in a set of similar users;
   generating a ranking of the set of similar users based on the energy usage of each user in the set of similar users;
   determine a target for the high energy user based on a rank of the high energy user among the set of similar users, wherein the target is a target rank of the high energy user to improve in the ranking by reducing energy usage;
   wherein the target rank is rounded down to the lowest number divisible by five; and
   transmit to the high energy user a communication comprising the determined target rank.

4. A non-transitory computer-readable storage medium including instructions that, when executed by a processor, cause the processor to:
   identify a set of similar users from energy usage data;
   identify a high energy user based on a comparison of energy usage of each user in the set of similar users;
   select, based on the comparison of energy usage, the high energy user to include in a campaign communication;
   generating a ranking of the set of similar users based on the energy usage of each user in the set of similar users;
   determine a target for the high energy user based on a rank of the high energy user in the ranking among the set of similar users, wherein the target is a target rank of the high energy user to improve in the ranking by reducing energy usage;
   wherein the target rank is a rank value rounded to a value ending in zero or five; and
   transmit to the high energy user, via a network communication, the campaign communication comprising the determined target rank.

5. The method of claim 1, wherein a set of users that use more energy than a threshold percentage of the set of similar users is selected to receive a campaign communication.

6. The method of claim 1, wherein the target is based on an average ranking of the at least one user.

7. The method of claim 2, wherein the target is based on the energy usage data of the at least one user or a rank among the set of similar users for a period before the campaign begins.

8. The method of claim 2, wherein the campaign lasts for a campaign period and the energy usage data is retrieved from a previous period one year prior to the campaign period.

9. The method of claim 2, further comprising:
   sending an outbound communication to the at least one user, the outbound communication comprising information regarding whether the at least one user has reached the target.

10. The system of claim 3, wherein the instructions further cause the processor to:
    select a subset of users from the set of similar users that use more energy than a threshold percentage to receive a campaign communication.

11. The system of claim 3, wherein the instructions further cause the processor to:
    provide updates to the high energy user in additional communications that indicate a progress being made to the determined target rank based on changes in the rank of the high energy user in the ranking.

12. The system of claim 3, wherein the target is further based on energy usage data of the high energy user.

13. The system of claim 3, wherein the target is based on an average ranking of the high energy user.

14. The system of claim 3, wherein to provide updates to the user further causes the processor to:

send a second communication to the high energy user, the second communication comprising information regarding whether the high energy user has reached the determined target rank.

15. The method of claim 5, wherein the threshold percentage is 75%.

16. The method of claim 8, wherein the campaign period is six months.

17. The method of claim 8 wherein the previous period is five months.

18. The system of claim 10, wherein the campaign communication is transmitted to the high energy user on an interval for a campaign period and the energy usage data is retrieved from a previous period one year prior to the campaign period.

* * * * *